United States Patent
Yuzer et al.

(10) Patent No.: US 11,691,918 B2
(45) Date of Patent: Jul. 4, 2023

(54) PRODUCTION METHOD OF READY INJECTION MATERIAL COMPRISING NANO HYDRAULIC LIME

(71) Applicant: Yildiz Teknik Universitesi, Istanbul (TR)

(72) Inventors: Nabi Yuzer, Istanbul (TR); Afife Binnaz Hazaryoruc, Esenler/Istanbul (TR); Mehmet Fevzi Uguryol, Besiktas/Istanbul (TR); Didem Oktay, Esenler/Istanbul (TR); Mehmet Bugra Guner, Esenler/Istanbul (TR)

(73) Assignee: Yildiz Teknik Universitesi, Istanbul (TR)

( * ) Notice: Subject to any disclaimer, the term of this patent is extended or adjusted under 35 U.S.C. 154(b) by 558 days.

(21) Appl. No.: 16/957,473

(22) PCT Filed: Dec. 26, 2018

(86) PCT No.: PCT/TR2018/050907
§ 371 (c)(1),
(2) Date: Jun. 24, 2020

(87) PCT Pub. No.: WO2019/132842
PCT Pub. Date: Jul. 4, 2019

(65) Prior Publication Data
US 2020/0331806 A1  Oct. 22, 2020

(30) Foreign Application Priority Data

Dec. 27, 2017 (TR) ............................. 2017/22327
Dec. 4, 2018 (TR) ............................. 2018/18529

(51) Int. Cl.
| | | |
|---|---|---|
| *C04B 28/12* | (2006.01) |
| *C04B 7/34* | (2006.01) |
| *C04B 40/00* | (2006.01) |
| *B82Y 30/00* | (2011.01) |
| *B82Y 40/00* | (2011.01) |
| *C04B 111/00* | (2006.01) |
| *C04B 111/70* | (2006.01) |
| *C04B 111/72* | (2006.01) |

(52) U.S. Cl.
CPC ............... *C04B 28/12* (2013.01); *C04B 7/34* (2013.01); *C04B 40/0042* (2013.01); *C04B 40/0046* (2013.01); *C04B 40/0067* (2013.01); *B82Y 30/00* (2013.01); *B82Y 40/00* (2013.01); *C04B 2111/00008* (2013.01); *C04B 2111/70* (2013.01); *C04B 2111/72* (2013.01)

(58) Field of Classification Search
CPC ....... C04B 28/12; C04B 7/34; C04B 40/0042; C04B 40/0046; C04B 40/0067; C04B 2111/00008; C04B 2111/70; C04B 2111/72; B82Y 30/00; B82Y 40/00
See application file for complete search history.

(56) References Cited

FOREIGN PATENT DOCUMENTS

WO    WO-2009098727 A2 *  8/2009  ............... C04B 7/34

OTHER PUBLICATIONS

International Search Report and Written Opinion of the International Searching Authority for International Patent Application No. PCT/TR2018/050907 dated Apr. 14, 2019, 9 pages.
Kalagri, A. et al., "Design and evaluation of hydraulic lime grouts for the strengthening of stone masonry historic structures", Materials and Structures, 43(8): 1135-1146 (Jan. 2010).
Maryniak-Piaszczynski, E. et al., "Nano-Lime as a Binder for Injection Grouts and Repair Mortars", Construction and Building Materials, 1160-1167 (Sep. 2010).
Oktay, D. et al., "Hidrolik Kirect Esasli Enjeksiyon Malzemesinin Tasarmi Ve Enjekte Edilebilirliginin Arastirilmasi—Design of Hydraulic Lime Based Grouts and Investigation for Their Injectability", Uluslararasi Katilimli 6. Tarihi Yapilarin Korunmasi Ve Guclendirilmesi Sempozyumu, 257-266 (Nov. 2017) (English Abstract).

* cited by examiner

*Primary Examiner* — Anthony J Green
(74) *Attorney, Agent, or Firm* — Merchant & Gould P.C.

(57) ABSTRACT

The present invention is the production method of ready injection material which aims to develop natural hydraulic lime in nano size by using a single raw material.

4 Claims, No Drawings

PRODUCTION METHOD OF READY INJECTION MATERIAL COMPRISING NANO HYDRAULIC LIME

CROSS-REFERENCE TO RELATED APPLICATIONS

This application is a National Stage Application of PCT/TR2018/050907, filed 26 Dec. 2018, which claims the benefit of Turkish Patent Application Serial No. 2017/22327, filed 27 Dec. 2017, and claims the benefit of Turkish Patent Application No. 2018/18529, filed 4 Dec. 2018, and which applications are incorporated herein by reference. To the extent appropriate, a claim of priority is made to each of the above-disclosed applications.

TECHNICAL FIELD

The present invention relates to the production method of the ready injection material comprising nano hydraulic lime which provides better injection characteristic when compared with conventional natural hydraulic lime.

BACKGROUND OF THE INVENTION

Injection method (grouting) is one of the frequently used methods in restoration of historical building. While injection is being applied, the injection material to be used shall be compliant to the unique material existing in the historical building and shall be penetrable to the crack which will be repaired. In order to increase injection performance of injection materials, particle dimensions of the materials existing in the composition shall be taken into consideration. By means of injection materials produced by using nano-sized lime, the repair of much thinner cracks is easily realized. By means of the present art, it is difficult to provide the penetration, volume fixedness and resistance values which are required for reinforcing historical buildings.

By means of said invention, production of lime whose strength is high and which is suitable for injection is aimed. In the known state of the art, there are separate studies related to production of nano-sized lime and production of natural hydraulic lime. In the subject matter patent application, by using a single raw material, natural hydraulic lime is developed in nano-size.

The structural and characteristic properties and all advantages of the present invention will be understood in a more clear manner by means of the below mentioned detailed description and evaluation shall be made by taking into consideration the below mentioned detailed description.

DESCRIPTION OF THE INVENTION

In this detailed description, the subject matter production method of ready injection material comprising nano hydraulic lime is explained with references to examples without forming any restrictive effect only in order to make the subject more understandable.

By means of the subject matter method, nano sized hydraulic lime production is realized. As a result of this method, lime is formed which is suitable for injection and which is strength. Particularly, the usage of a single material as raw material is one of the most important steps of the method.

The present invention relates to the production method of ready injection material comprising nano hydraulic lime, said production method is characterized by comprising the steps of:

a. Selecting marl (clayed lime-stone), comprising at least 70% $CaCO_3$, as the raw material,
b. Grinding marl (clayed lime-stone), selected as the raw material, so as to have particle size smaller than 400 μm,
c. Calcining marl (clayed lime-stone), selected as the raw material, between temperatures 1000-1200° C.,
d. Re-grinding marl (clayed lime-stone), selected as the raw material, after the calcination process,
e. Reducing the $d_{90}$ particle size of the calcined marl to 486 nm after the grinding process,
f. Applying dry mixing process to the material whose particle size is reduced,
g. Adding water to the material after the dry mixing process and applying mechanical mixing process for duration between 3-6 minutes at a revolution between 800 and 1000 rpm,
h. Adding super-fluidizing chemical additive to the obtained material,
i. Mixing the material for duration between 3-6 minutes by using ultrasonic homogenizer and mechanical mixing.

In step a), said marl (clayed lime-stone) including at least 70% $CaCO_3$ also comprises the compounds of $SiO_2$, $Al_2O_3$, $Fe_2O_3$ and $MgO$ in addition to $CaCO_3$.

In step b), whole of the product is grinded so as to have particle size smaller than 400 μm.

In step g), the water/dry powder proportion changes between 1.6 and 1.9 by weight. In this step, the added water provides fluidity, volume fixedness and penetration properties to the material.

In step h), the super-fluidizing chemical additive added to the material is selected from naphthalene or poly-carboxylate based super fluidizers.

In the present invention, the most important step of the production method of the ready injection material comprising nano hydraulic lime is the selection of the raw material. In the grinding process which is one of the steps of the method, the used material is reduced to nano size. Another important step is calcination. Calcination is the main process of lime production. The raw material reduced to the desired size is calcined at suitable temperature by using known methods, and natural hydraulic lime production is realized.

During the step of preparation of the injection material which is one of the most important steps of said method, the limit conditions of fluidity, volume fixedness and penetration properties are fulfilled which shall be provided by the injection materials by means of the selected amount of water, chemical additive proportion and applied mixing procedure.

The present invention is the method of production of ready injection material comprising nano hydraulic lime and has been developed for eliminating the disadvantages formed by the present art.

From another perspective, the present invention relates to a ready injection material comprising nano-hydraulic lime obtained by means of the subject matter production method.

The ready injection materials produced by means of the subject matter method have higher hydraulic effects and are more resistant when compared with the materials obtained by means of known methods.

Accordingly, another item of the present invention is the ready injection material comprising nano-hydraulic lime, characterized in that it is obtained by means of a method formed by the steps of:

a. Selecting marl (clayed lime-stone), comprising at least 70% $CaCO_3$, as the raw material, b. Grinding marl (clayed lime-stone), selected as the raw material, so as to have particle size smaller than 400 µm,
c. Calcining marl (clayed lime-stone), selected as the raw material, between temperatures 1000-1200° C.,
d. Re-grinding marl (clayed lime-stone), selected as the raw material, after the calcination process,
e. Reducing the $d_{90}$ particle size of the calcined marl to 486 nm after the grinding process,
f. Applying dry mixing process to the material whose particle size is reduced,
g. Adding water to the material after the dry mixing process and applying mechanical mixing process for duration between 3-6 minutes at a revolution between 800 and 1000 rpm,
h. Adding super-fluidizing chemical additive to the obtained material,
i. Mixing the material for duration between 3-6 minutes by using ultrasonic homogenizer and mechanical mixing.

It is apparent that a person skilled in the art can provide the novelty, provided in the present invention, by using similar methods and/or that a person skilled in the art can apply these methods to other areas with similar purpose used in the related art. Thus, it is also apparent that such methods lack novelty and particularly lack the criterion of surpassing the known state of the art.

The invention claimed is:

1. A production method of ready injection material comprising nano hydraulic lime, said production method is characterized by comprising the steps of:

a. Selecting a marl (clayed limestone), comprising at least 70% $CaCO_3$, as the raw material,
b. Grinding the marl, so as to have particle size smaller than 400 µm,
c. Calcining the marl, between temperatures 1000-1200° C.,
d. Re-grinding the marl, after the calcination process,
e. Reducing the $d_{90}$ particle size of the calcined marl to 486 nm after the re-grinding process,
f Applying dry mixing process to the material whose particle size is reduced,
g. Adding water to the material after the dry mixing process and applying mechanical mixing process for duration between 3-6 minutes at a revolution between 800 and 1000 rpm,
h. Adding a super-fluidizing chemical additive to the material obtained in step g.,
i. Mixing the material for a duration between 3-6 minutes by using ultrasonic homogenizer and mechanical mixing.

2. The method according to claim 1, wherein in step a), said marl also comprises the compounds of $SiO_2$, $Al_2O_3$, $Fe_2O_3$ and MgO.

3. The method according to claim 1, wherein in step g), a weight ratio of the water to the dry mixed material is in a range between 1.6 and 1.9.

4. The method according to claim 1, wherein in step h), the super-fluidizing chemical additive is selected from naphthalene and a poly-carboxylate based super fluidizer.

* * * * *